United States Patent

Moret de Rocheprise

[11] Patent Number: 5,207,960
[45] Date of Patent: May 4, 1993

[54] METHOD FOR THE MANUFACTURE OF THIN TUBES OF FLUORINATED RESIN, PARTICULARLY OF POLYTETRAFLUOROETHYLENE

[75] Inventor: Bernard Moret de Rocheprise, Chalindrey, France

[73] Assignee: Compagnie Plastic Omnium, Lyons, France

[21] Appl. No.: 706,897

[22] Filed: May 29, 1991

[30] Foreign Application Priority Data

May 30, 1990 [FR] France ................... 90 06723

[51] Int. Cl.⁵ ............... B29C 55/26; B29C 39/36
[52] U.S. Cl. ................... 264/103; 72/96; 156/149; 156/194; 264/127; 264/293; 264/310; 264/323; 264/331.14; 264/334; 264/DIG. 66; 264/291; 425/329; 425/393; 425/402; 425/DIG. 55
[58] Field of Search ............ 264/103, 127, 41, 175, 264/280, 293, 288.4, 310, 323, 331.14, 334, 291, DIG. 66; 425/329, 402, DIG. 55, 393; 156/149, 184, 196, 194; 72/96, 97, 208

[56] References Cited

U.S. PATENT DOCUMENTS

| | | | |
|---|---|---|---|
| 2,964,065 | 12/1960 | Haroldson et al. | 264/297.8 |
| 3,089,187 | 5/1963 | Wolfe . | |
| 3,566,653 | 3/1971 | Unrath | 72/96 |
| 3,695,076 | 10/1972 | Kocks | 72/97 |
| 4,478,898 | 10/1984 | Kato | 264/127 |
| 4,577,481 | 3/1986 | Staat | 72/97 |
| 4,898,702 | 2/1990 | Elkins et al. | 264/145 |
| 5,109,689 | 5/1992 | D'Avanzo | 72/208 |

FOREIGN PATENT DOCUMENTS

| | | |
|---|---|---|
| 1175422 | 8/1964 | Fed. Rep. of Germany . |
| 2218987 | 9/1974 | France . |
| 1466183 | 3/1977 | United Kingdom . |

Primary Examiner—Jan H. Silbaugh
Assistant Examiner—Mathieu Vargot
Attorney, Agent, or Firm—Schweitzer Cornman & Gross

[57] ABSTRACT

A process for the manufacture of a thin-walled tube of fluorinated resin, particularly polytetrafluoroethylene, in which a ribbon of fluorinated resin obtained by lubricated extrusion and calendaring, is wound into a tube on a mandrel, the winding of the ribbon being performed in a plurality of layers, and the thus-wound ribbon on the mandrel being brought to a temperature above the sintering temperature of the fluorinated resin for sufficient time to produce sintering. The wound tube and the mandrel are cooled; while on the mandrel the thin-walled tube is rolled to elongate the tube, to reduce the thickness of the tube, and to increase the inside diameter of the tube; and then the mandrel within the tube is extracted.

3 Claims, 1 Drawing Sheet

METHOD FOR THE MANUFACTURE OF THIN TUBES OF FLUORINATED RESIN, PARTICULARLY OF POLYTETRAFLUOROETHYLENE

BACKGROUND OF THE INVENTION

The present invention relates to a process for the manufacture of tubes of fluorinated resin, particularly polytetrafluoroethylene (PTFE), of slight thickness.

The method of the present invention is of the type described in patent FR-A-2,218,987 of the Compagnie Plastic Omnium, and comprises the steps consisting of winding on a mandrel a ribbon of crude fluorinated resin, particularly PTFE, obtained particularly by lubricated extrusion and calendering, the winding of the ribbon being performed in a plurality of layers, bringing the ribbon thus wound on the mandrel to a temperature above the sintering temperature of the fluorinated resin for a sufficient time to produce sintering cooling the tube and the mandrel, and extracting the mandrel situated inside of the tube.

The tubes thus obtained can be used particularly as sheaths for the lining of metal tubes, particularly as described in Patent FR-A-2,292,175 of the Compagnie Plastic Omnium.

The process described above for making tubes, particularly of PTFE, is satisfactory when the thickness of the tubes formed must be on the order of 3 mm or more, particularly for tubes intended to form sheaths resistant to corrosion by transported chemical products.

In this case the extraction of the mandrel at the end of the heating step intended to produce the gelling of the resin poses no particular problem. It suffices in this case to exert traction while holding the end of the tube, after slightly heating the tube to expand it, if necessary.

It is necessary, on the other hand, for certain applications, for example for sheaths mounted in bundles inside of heat exchangers, to make tubes of fluorinated resin, particularly of PTFE, which have a smaller thickness, i.e., much smaller than that of the tubes traditionally manufactured by the above-mentioned process, for example tubes of 1 to 2 mm of thickness, or even tubes of from one to a few tenths of millimeters of thickness.

In this case it is found, when carrying out the process described, that the extraction of the mandrel with respect to the tube proves to be very difficult, even impossible, without damaging the tube.

When the operation of preliminary heating is performed, the tube shrinks strongly, mainly in its diameter, and there is a great tightening stress of the tube on the mandrel, preventing extraction.

SUMMARY OF THE PRESENT INVENTION

The present invention has as its object an improvement in the process described above, intended to permit chiefly the achievement of tubes of slight thickness, the process in accordance with the invention being characterized essentially by the fact that, after the step consisting of cooling the tube and the mandrel, and before the step consisting of extracting the mandrel located inside of the tube, one proceeds to a rolling of the tube held on the mandrel.

The rolling step according to the invention can be performed by any appropriate mechanical means apt to produce a slight reduction of the thickness of the tube at the same time as a slight elongation thereof, and hence a swelling of its diameter.

Preferably, according to the invention, the rolling is performed so as to cause a reduction in thickness of between 1% and 3%, and an elongation in the same proportions, and hence also between 1% and 3%.

In one preferred embodiment, the operation of rolling is a wheeling operation, using in particular a set of three motor-driven wheels rotating in the same sense, arranged around the tube held on the mandrel with their axes inclined at the same angle, for example between 3° and 15° each, with respect to three planes passing through the axis of the mandrel and forming between them angles of 120° so that, when they rotate, each wheel rotates without slipping along a helical contact zone on the periphery of the tube. The tube held on the mandrel is simultaneously driven axially and in rotation by the rotation of the wheels.

DETAILED DESCRIPTION OF THE INVENTION

Figure 1:
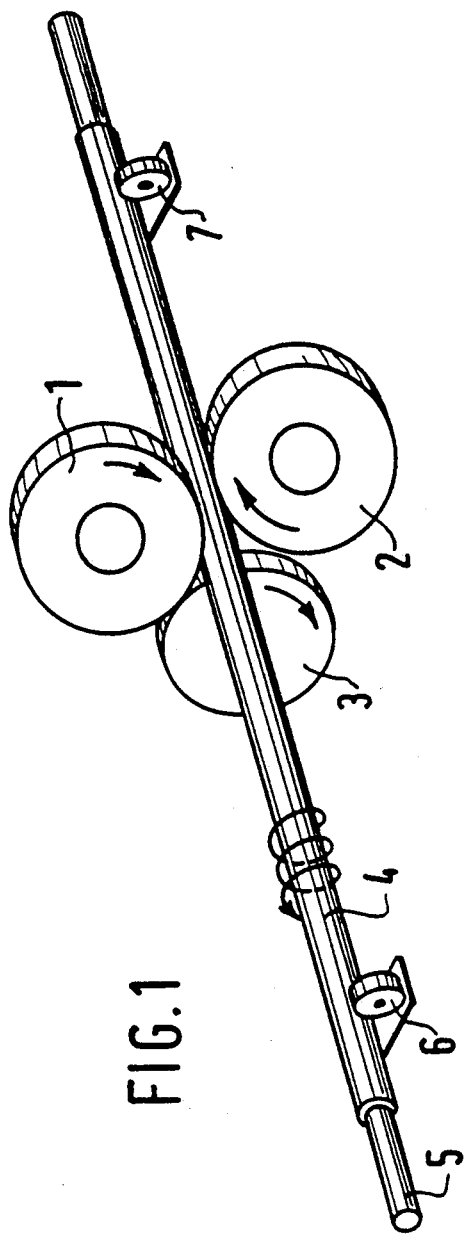
In FIGS. 1 and 2 of the drawing an installation has been depicted diagrammatically in perspective and in a top view, respectively, making it possible to perform the rolling step with a helical wheel arrangement of this kind.
Figure 2:
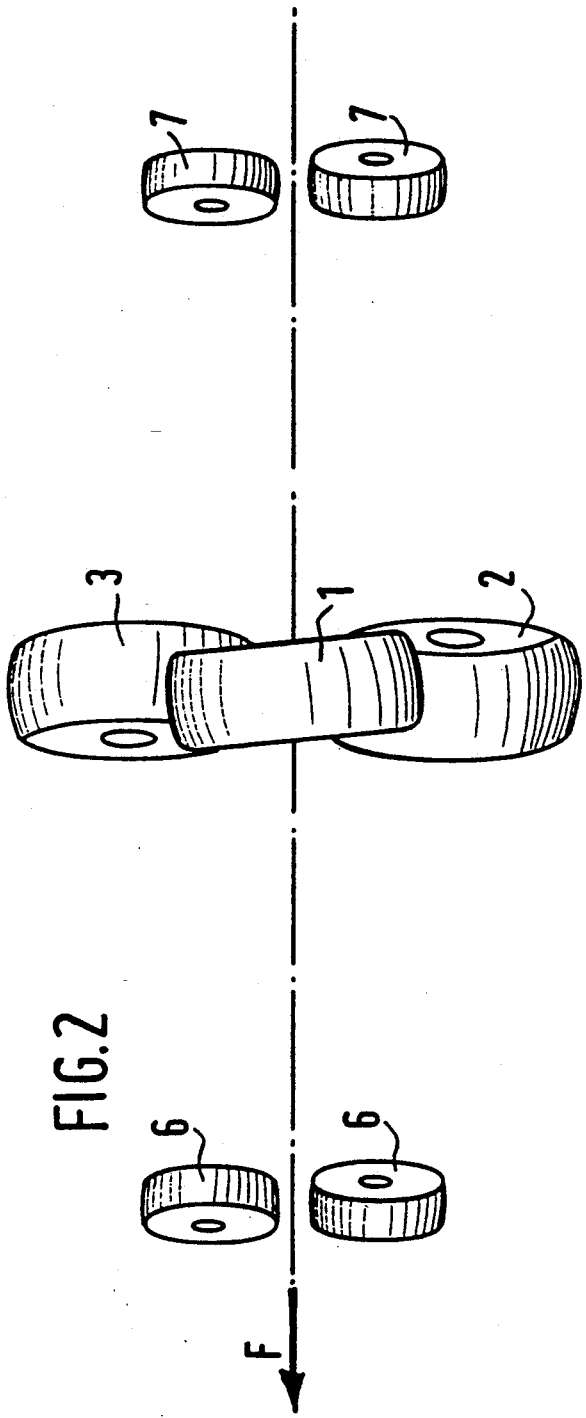

Thus, three wheels 1, 2 and 3, have been depicted in the drawing, driven in rotation, in the same sense indicated by the arrows in FIG. 1, by driving means not represented.

As indicated above, this assembly of wheels simultaneously provides the axial advancement (arrow F) and the rotation on itself of a tube 4 held on a mandrel 5, performing a rolling of the tube.

In the installation depicted in the drawing, pairs of guide rollers 6 and 7, respectively, one on each side of the assembly of wheels 1, 2 and 3.

Of course, the installation depicted is but one example of other possible examples for performing the rolling step according to the invention.

It is possible in particular to foresee installations having separate means for performing the rolling proper, on the one hand, and the advancement of the tube held on the mandrel on the other.

A description will now be given of an example of a tube made according to the invention.

EXAMPLE

A virgin PTFE powder is used having an average granulometry of 500 $\mu$m. This powder is mixed with an isoparaffin lubricant (ISOPAR) at the rate of 20% by weight of lubricant to 80% by weight of powder.

A preform is made by compressing at a pressure of 15 kg/cm$^2$ the mixture of powder and lubricant. This preform, which is in the form of a cylinder 6 cm long and 15 mm in diameter, is placed in an extruder to form a ribbon having a thickness of 1 mm. This ribbon has a density of 1.5.

The ribbon thus prepared is then calendered so as to obtain a ribbon having a thickness of 0.8 $\mu$m.

The ribbon is then heated to eliminate the lubricant.

The ribbon thus obtained has a density of 1.6 and is then cut to the desired width.

The 40 millimeter wide ribbon thus obtained is then wound on a mandrel having a diameter of 40 mm, with a pitch of 20 mm.

Thus, at each run of winding a superimposition of 2 layers of ribbon is performed. Seven layers of spirals are then laid down so as to form a tube with a thickness of 1.1 mm before baking.

After having performed this winding the mandrel and its covering of PTFE ribbon is placed in an oven at 360° C. This temperature is maintained for 1 hour, after which a rapid cooling to the ambient temperature is performed.

The tube at this stage has a thickness of 0.82 mm and a density of 2.15.

The tube is then rolled in the installation depicted in the drawing, so as to bring the thickness of the tube to 0.81 mm, performing an elongation of 1.25%, the inside diameter of the tube changing from 40 mm to 40.5 mm.

The mandrel is then extracted, which is done without the least difficulty and without in any way damaging the tube.

Although the invention has been described in connection with one particular embodiment, it is quite obvious that it is by no means limited thereto, and that variants and modifications can be made to it without thereby departing from its scope or its spirit.

I claim:

1. A process for the manufacture of thin-walled tubes of wall thickness of less than 2 mm of fluorinated resin comprising the steps of:
    a) winding a ribbon of fluorinated resin into a tube on a mandrel and holding said tube on the mandrel,
    b) heating said ribbon to a temperature above the sintering temperature of the fluorinated resin and maintaining it at said temperature for sufficient time to sinter the resin,
    c) rolling the tube between wheels while it is being held on the mandrel to reduce its thickness, to elongate it and to increase its inside diameter to facilitate tube extraction from the mandrel, and
    d) extracting said tube from said mandrel.

2. Process according to claim 1, wherein
    (a) the rolling step is performed so as to effect a reduction of thickness of the tube between 1% and 3% and an elongation of between 1% and 3% and a commensurate increase in the inside diameter of the thin-walled tube.

3. A process according to claim 1, wherein
    (a) an assembly of motor-driven wheels is arranged to produce rolling advancement and a rotation of the tube while it is held on the mandrel.

* * * * *